US009801180B2

(12) United States Patent
Lim et al.

(10) Patent No.: US 9,801,180 B2
(45) Date of Patent: Oct. 24, 2017

(54) METHOD AND APPARATUS FOR TRANSMITTING AND RECEIVING DATA OVER CARRIER COMPONENT IN A MULTI-CARRIER MOBILE COMMUNICATION SYSTEM

(71) Applicant: Samsung Electronics Co., Ltd., Suwon-si, Gyeonggi-do (KR)

(72) Inventors: Jun-Sung Lim, Seoul (KR); Hi-Chan Moon, Yongin-si (KR); Seong-Woo Ahn, Seongnam-si (KR); Jung-Su Han, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 69 days.

(21) Appl. No.: 14/846,139

(22) Filed: Sep. 4, 2015

(65) Prior Publication Data

US 2015/0382351 A1 Dec. 31, 2015

Related U.S. Application Data

(63) Continuation of application No. 14/147,122, filed on Jan. 3, 2014, now Pat. No. 9,130,731, which is a continuation of application No. 13/015,004, filed on Jan. 27, 2011, now Pat. No. 8,626,219.

(30) Foreign Application Priority Data

Feb. 16, 2010 (KR) .......................... 10-2010-0013881

(51) Int. Cl.
*H04W 72/04* (2009.01)
*H04L 5/00* (2006.01)
(Continued)

(52) U.S. Cl.
CPC ......... *H04W 72/0453* (2013.01); *H04L 5/001* (2013.01); *H04L 5/0091* (2013.01);
(Continued)

(58) Field of Classification Search
CPC ..... H04L 5/001; H04L 5/0096; H04L 5/0098; H04L 5/0091; H04L 5/0007;
(Continued)

(56) References Cited

U.S. PATENT DOCUMENTS 8,112,094 B1 2/2012 Wellington
2007/0076670 A1 4/2007 Kuchibhotla et al.
(Continued)

FOREIGN PATENT DOCUMENTS

KR 10-2008-0070644 A 7/2008
KR 10-2010-0014118 A 2/2010

OTHER PUBLICATIONS

Youngsoo Yuk et al., Proposed Text Related to PHY Section of Multicarrier Support for the IEEE 802.16m Amendment, IEEE 802.16 Broadband Wireless Access Working Group, Apr. 27, 2009, IEEE C802.16m-9/1095, IEEE.

*Primary Examiner* — Jae Y Lee
(74) *Attorney, Agent, or Firm* — Jefferson IP Law, LLP

(57) ABSTRACT

A method for receiving data over a plurality of carrier components at a Mobile Station (MS) is provided. The method includes receiving, from a Base Station (BS), resource allocation information including a first allocation information indicating at least one resource allocated to a first carrier component in a first subframe and a second allocation information indicating at least one resource allocated to a second carrier component in a second subframe and receiving data, from the BS, on the at least one resource of the first carrier component and on the at least one resource of the second carrier component based on the resource allocation information.

20 Claims, 9 Drawing Sheets

(51) Int. Cl.
  *H04W 8/24* (2009.01)
  *H04W 24/00* (2009.01)
  *H04W 28/08* (2009.01)
  *H04W 88/08* (2009.01)

(52) U.S. Cl.
  CPC .......... *H04L 5/0096* (2013.01); *H04L 5/0098* (2013.01); *H04L 5/0007* (2013.01); *H04W 8/24* (2013.01); *H04W 24/00* (2013.01); *H04W 28/08* (2013.01); *H04W 72/042* (2013.01); *H04W 88/08* (2013.01)

(58) Field of Classification Search
  CPC ... H04W 72/0453; H04W 8/24; H04W 28/08; H04W 72/042; H04W 88/08; H04W 24/00
  See application file for complete search history.

(56) References Cited

U.S. PATENT DOCUMENTS

| | | |
|---|---|---|
| 2009/0110033 A1 | 4/2009 | Shattil |
| 2010/0285809 A1 | 11/2010 | Lindstrom et al. |
| 2010/0303011 A1* | 12/2010 | Pan .................. H04L 5/001 370/328 |
| 2011/0064042 A1 | 3/2011 | Kim et al. |
| 2011/0255451 A1 | 10/2011 | Moon et al. |
| 2012/0033643 A1 | 2/2012 | Noh et al. |
| 2012/0057490 A1 | 3/2012 | Park et al. |
| 2012/0057560 A1 | 3/2012 | Park et al. |
| 2012/0099491 A1 | 4/2012 | Lee et al. |
| 2012/0127950 A1 | 5/2012 | Chung et al. |
| 2012/0257554 A1 | 10/2012 | Kim et al. |
| 2013/0039342 A1 | 2/2013 | Kazmi |

\* cited by examiner

METHOD AND APPARATUS FOR TRANSMITTING AND RECEIVING DATA OVER CARRIER COMPONENT IN A MULTI-CARRIER MOBILE COMMUNICATION SYSTEM

PRIORITY

This application is a continuation application of prior application Ser. No. 14/147,122, filed on Jan. 3, 2014, which has issued as U.S. Pat. No. 9,130,731 on Sep. 8, 2015 which is a continuation of prior application Ser. No. 13/015,004, filed on Jan. 27, 2011, which has issued as U.S. Pat. No. 8,626,219 on Jan. 7, 2014 and claimed the benefit under 35 U.S.C §119(a) of a Korean patent application filed on Feb. 16, 2010 in the Korean Intellectual Property Office and assigned Serial number 10-2010-0013881, the entire disclosure of which is hereby incorporated by reference.

BACKGROUND OF THE INVENTION

1. Field of the Invention

The present invention relates to a method and apparatus for transmitting and receiving data in a multi-carrier mobile communication system. More particularly, the present invention relates to a method and apparatus for transmitting and receiving data over a Carrier Component (CC).

2. Description of the Related Art

To support the increase in the amount of data in current mobile communications, extensive research has been conducted to maximize transmission efficiency, increase system capacity, and ensure instantaneous high data rates. To serve these purposes, it is generally more efficient to transmit and receive data over a plurality of carriers than over a single carrier as is conventionally done. Accordingly, many techniques have been proposed to transmit and receive data over a plurality of carriers.

The Long Term Evolution-Advanced (LTE-A) or Institute of Electrical and Electronics Engineers (IEEE) 802.16m standard, which is a candidate for the 4th Generation (4G) mobile communication system, International Mobile Telecommunications-Advanced (IMT-A), proposed Carrier Aggregation (CA) as a main 4G evolution technology. CA is a technique that uses a plurality of successive or scattered frequency bands as a single frequency band. Since a specific Mobile Station (MS) can transmit and receive data simultaneously over a plurality of CCs according to the CA technology, an instantaneous peak data rate is increased.

However, the increase of an instantaneous peak data rate on a subframe basis is not so meaningful to a packet-based mobile communication system. Rather, it is expected that the CC technology is used to distribute an increased system load using additional CCs, if a service is not provided reliably with existing limited resources due to the increased system load. Compared to conventional data transmission and reception over a single CC, data transmission and reception over multiple CCs will increase the structural complexity of a transmitter and a receiver.

Mobile communication systems such as LTE and IEEE 802.16m systems adopt Orthogonal Frequency Division Multiple Access (OFDMA) as a multiple access scheme. The LTE system uses a channel bandwidth of 1.25 to 20 MHz and supports a data rate of up to 100 Mbps. The LTE system defines a Physical Downlink Control Channel (PDCCH) for carrying control information needed to receive data on a Physical Downlink Shared Channel (PDSCH).

Now a description will be given of an operation of an MS in a typical system that transmits and receives data over multiple CCs.

FIG. 1 illustrates an operation of an MS for receiving data in a mobile communication system where data is transmitted and received over multiple CCs in the case where each CC carries a control channel according to the related art.

Referring to FIG. 1, reference numeral 100 denotes an operation of an MS over a first CC 102 (CC1) and reference numeral 150 denotes an operation of the MS over a second CC 152 (CC2). The CC1 and CC2 are both configured as a subframe with a control channel carrying Resource Allocation Information (RAI) and a data channel carrying data.

Upon receipt of CC1, the MS acquires control information about CC1 during a first time period 106 (T1). During a second time period 108 (T2), the MS decodes the control information and detects resources allocated to the MS according to the decoded control information. The MS then buffers all DownLink (DL) data received on CC 1. The reason for buffering all DL data during the time period T2 is that the MS does not know a resource area to which a data channel has been allocated because the control information decoding is not completed. Therefore, all DL data received until the control information decoding is completed should be buffered.

During a third time period 110 (T3), the MS receives data in a resource area 114 of subframe 1, indicated by the completely decoded control information, as denoted by reference numeral 112.

Upon receipt of CC2, the MS acquires control information about CC2 during a fourth time period 154 (T4). During a fifth time period 156 (T5), the MS decodes the control information and detects a resource area 160 allocated to the MS according to the decoded control information, as indicated by reference numeral 158. The MS then buffers all DL data received on CC2.

FIG. 2 illustrates an operation of an MS for receiving data in a mobile communication system where data is transmitted and received over multiple CCs in the case where some CCs do not carry a control channel according to the related art.

Referring to FIG. 2, reference numeral 200 denotes an operation of an MS over a first CC 202 (CC1) and reference numeral 250 denotes an operation of an MS over a second CC 252 (CC2). CC1 is configured as a subframe including a control channel carrying Resource Allocation Information (RAI) and a data channel carrying data, whereas CC2 is configured as a subframe including only a data channel. It is assumed herein that the control channel of CC1 also carries RAI indicating resources to which the data channel of CC2 is allocated. Accordingly, to receive data on CC2, the MS should first acquire the RAI about CC2 from the control channel of CC1.

Upon receipt of CC1, the MS acquires control information of CC1 during a time period 204 (T1). During a time period 206 (T2), the MS decodes the control information and detects an allocated resource area using the decoded control information. At the same time, the MS buffers all DL data received on the data channel of CC1. The reason for buffering all DL data during the time period T2 is that the MS does not know the resource area to which the data channel has been allocated because the control information decoding is not completed. Therefore, all DL data received until the control information decoding is completed should be buffered.

During a time period 208 (T3), the MS receives data in a resource area 212 of subframe 1, indicated by the completely decoded control information, as denoted by reference numeral 210.

Upon receipt of CC2, the MS buffers DL data received across a total bandwidth of CC2 until the control information of CC1 is completely decoded, because the MS does not know resources allocated to the data channel of CC2, as indicated by reference numeral 254. After the decoding of the control information of CC1 is completed, the MS receives data in allocated resources 260 indicated by the control information, as indicated by reference numeral 258.

In relation to FIGS. 1 and 2, as the number of CCs increases, several problems occur that decrease the efficiency of an MS and increase the complexity and power consumption of the MS:

1) Since the design complexity of an MS is increased due to data transmission and reception over a wide frequency band and data demodulation, the cost of the MS is increased.

2) An increased Peak-to-Average Power Ratio of a transmitter decreases power efficiency, causes distortion, and increases an amplifier cost.

3) Because data is transmitted with limited transmission power in a broad band, coverage performance is degraded.

4) More data is buffered.

5) The number of control signal processes and blind decoding searches increase.

The problems listed as 4) and 5) will be described in greater detail.

With respect to the increase of data buffering, a control channel carrying RAI is generally allocated to a subframe corresponding to a data transmission time. To receive DL data, the MS should temporarily buffer all data received across a total band during a time period (e.g. T2 and T5) in which the MS decodes a control channel and detects an allocated resource area based on the decoded control channel. Since the MS should buffer more data for more CCs, a memory requirement is increased and as a consequence, the volume of computation is also increased. The buffering problem gets worse when a control channel is multiplexed with a data channel in Frequency Division Multiplexing (FDM) in the IEEE 802.16m system.

With respect to the increase in the number of control signal processes and blind decoding searches, a control channel carries RAI for a plurality of MSs. To transmit RAI to a specific MS, a Base Station (BS) should transmit an Identifier (ID) of the MS along with the RAI. Due to the resulting huge overload, the LTE or IEEE 802.16m system masks a Cyclic Redundancy Check (CRC) added to control information by the ID of an MS. Accordingly, the specific MS should detect its control information through blind decoding of all resource areas of a control channel. This blind decoding search requires a large amount of computation. In the illustrated case of FIG. 1 in which each CC has a control channel, the increase of computation volume in turn increases a time period taken to decode the control channel. As a result, the amount of buffered data or a Hybrid Automatic Repeat reQquest (HARQ) process latency is increased, thereby degrading performance.

Therefore, data transmission and reception over multiple CCs imposes a constraint on an MS that is more sensitive to cost and efficiency than a BS. Because using CA for the purpose of distributing overall system load over a plurality of CCs is more promising than for the purpose of simultaneously transmitting data over a plurality of CCs at one time, a more reasonable design is desired. There exists a pressing need for designing an MS capable of transmitting one CC or a small number of CCs simultaneously, instead of an MS that simultaneously processes multiple CCs, and a system that distributes system load well across a plurality of CCs.

SUMMARY OF THE INVENTION

An aspect of the present invention is to address at least the above-mentioned problems and/or disadvantages and to provide at least the advantages described below. Accordingly, an aspect of the present invention is to provide a method and apparatus for transmitting and receiving data over a plurality of Carrier Components (CCs) in a mobile communication system.

Another aspect of the present invention is to provide a method and apparatus for efficiently configuring a plurality of CCs and transmitting and receiving data over the CCs in a multi-carrier mobile communication system.

In accordance with an aspect of the present invention, a method for receiving data at an MS is provided. The method includes reporting a number of Carrier Components (CCs) over which the MS can simultaneously receive data to a BS, receiving monitoring CC set information indicating as many monitoring CCs as the reported number of CCs or fewer monitoring CCs than the reported number of CCs from the BS, and receiving data from the BS based on the monitoring CCs indicated by the monitoring CC set information.

In accordance with an aspect of the present invention, a method for transmitting data at a BS is provided. The method includes receiving information about a number of CCs over which the MS can simultaneously receive data form an MS, transmitting monitoring CC set information indicating as many monitoring CCs as the number of CCs indicated by the received information or fewer monitoring CCs than the number of CCs indicated by the received information to the MS, and transmitting data to the MS based on the monitoring CCs.

In accordance with an aspect of the present invention, an apparatus for receiving data at an MS is provided. The apparatus includes a transceiver, and a controller for controlling the transceiver to report to a BS a number of CCs over which the MS can simultaneously receive data, to receive from the BS monitoring CC set information indicating as many monitoring CCs as the reported number of CCs or fewer monitoring CCs than the reported number of CCs, and to receive data from the BS based on the monitoring CCs indicated by the monitoring CC set information.

In accordance with an aspect of the present invention, an apparatus for transmitting data at a BS is provided. The apparatus includes a transceiver, and a controller for controlling the transceiver to receive from an MS information about a number of CCs over which the MS can simultaneously receive data, to transmit to the MS monitoring CC set information indicating as many monitoring CCs as the number of CCs indicated by the received information or fewer monitoring CCs than the number of CCs indicated by the received information, and to transmit data to the MS based on the monitoring CCs.

In accordance with an aspect of the present invention, a method for receiving data at a Mobile Station (MS) is provided. The method includes determining a maximum number of Carrier Components (CCs) over which the MS can simultaneously receive data, transmitting the maximum number of CCs to a Base Station (BS), receiving, from the BS, monitoring CC set information indicating a number of monitoring CCs less than or equal to the maximum number of CCs, when the monitoring CC set information is not received after a preset timer expires, retransmitting the maximum number of CCs, and communicating with the BS based on the monitoring CC set information received from the BS.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

Figure 1:
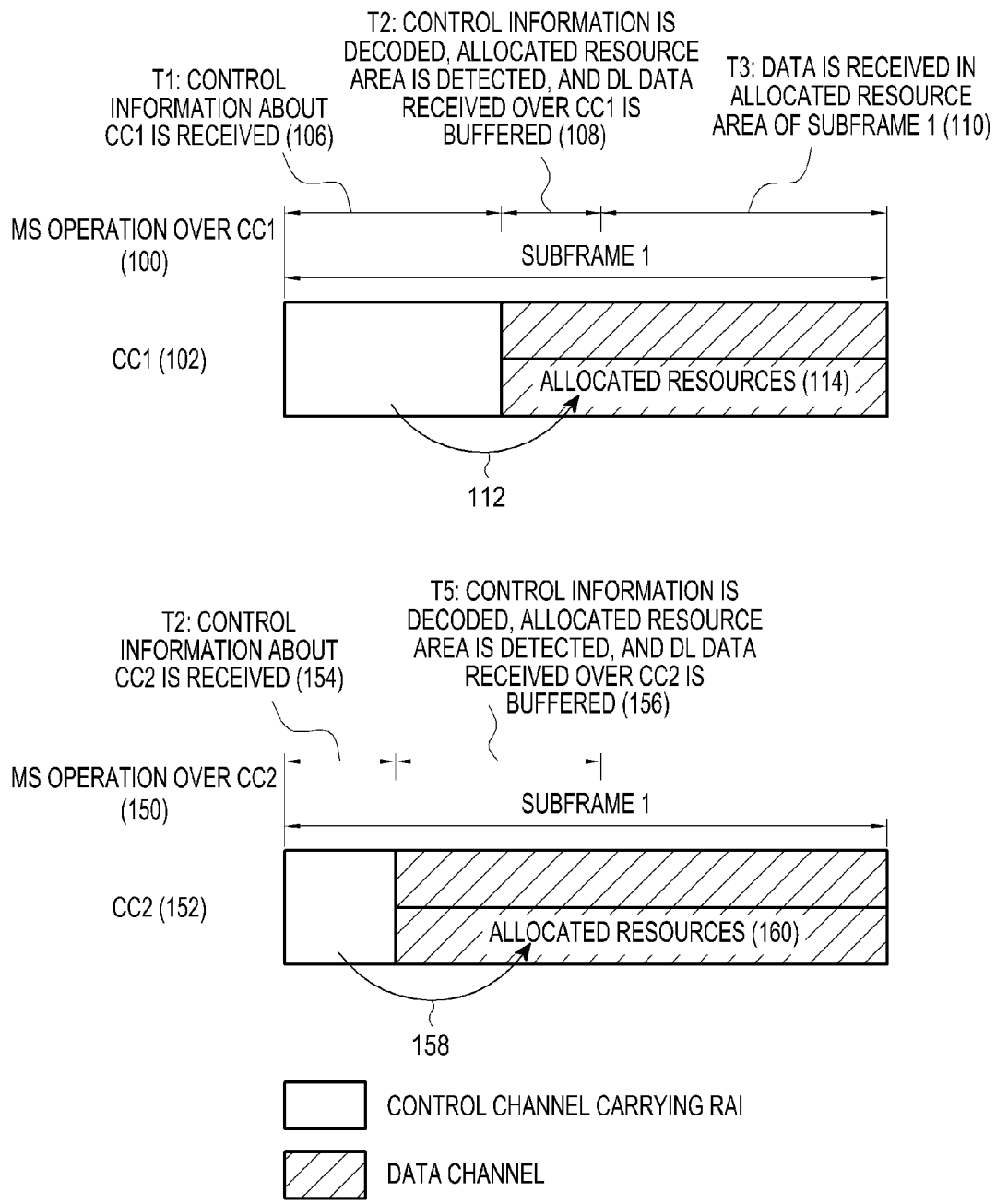
FIG. 1 illustrates an operation of an MS for receiving data in a mobile communication system where data is transmitted and received over multiple Carrier Components (CCs) in the case where each CC carries a control channel according to the related art.
Figure 2:
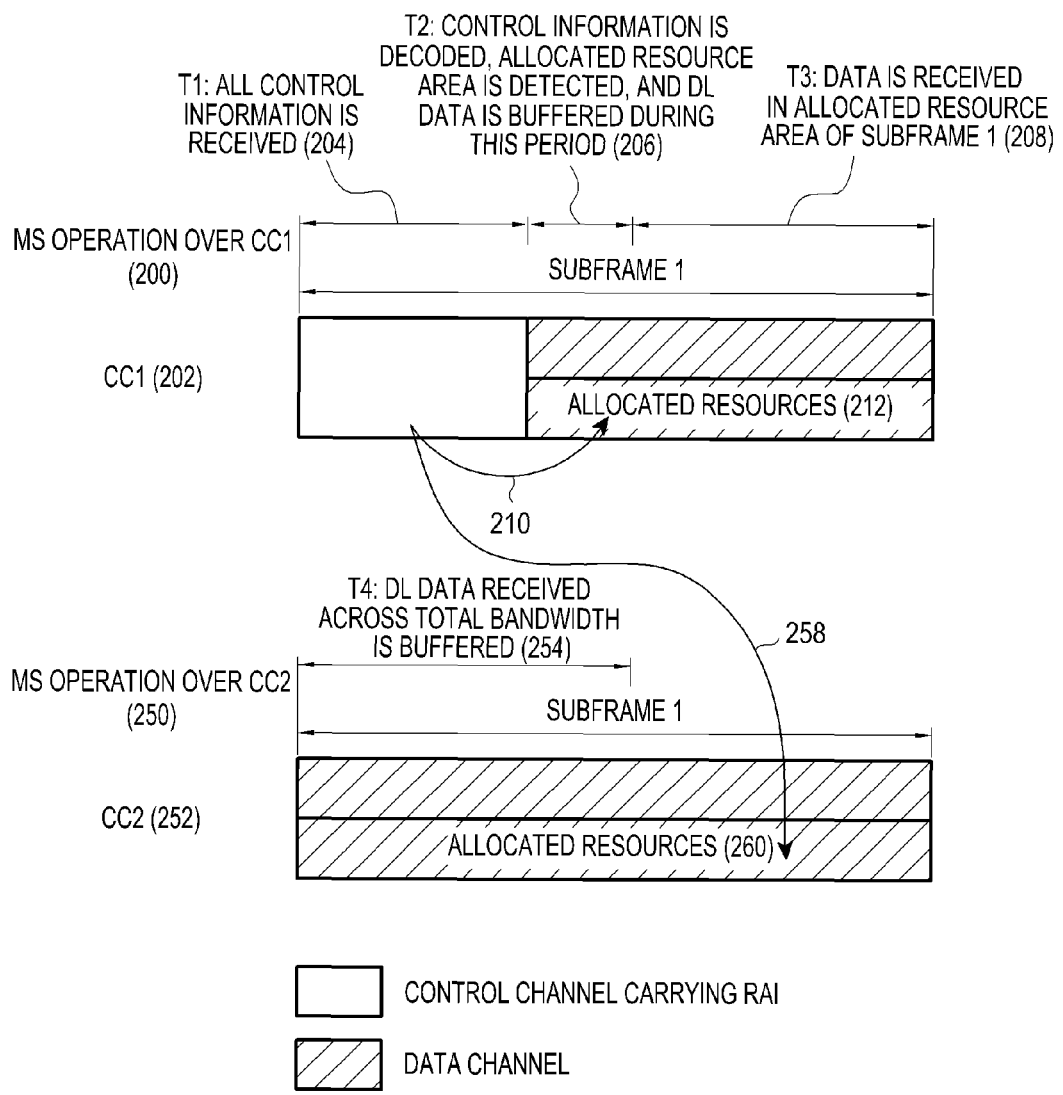
FIG. 2 illustrates an operation of an MS for receiving data in a mobile communication system where data is transmitted and received over multiple CCs in the case where every CC does not carry a control channel according to the related art.

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In accordance with an exemplary embodiment of the present invention, the number of Carrier Components (CCs) which a Mobile Station (MS) can simultaneously transmit and receive is limited to or below a predetermined value and thus a Base Station (BS) can transmit data to the MS over a part of entire CCs, in order to mitigate the design complexity of MSs that transmit and receive data over a plurality of CCs.

Exemplary embodiments of the present invention are applicable according to a method for transmitting control information over CCs. If the number of CCs supported by a BS is different from the number of CCs supported by an MS, a resource allocation method and resource allocation information transmission method for load balancing of CCs are considered in the following two cases.

One of the two cases is that every CC includes control information, that is, its Resource Allocation Information (RAI), and the other case is that some CCs do not include control information and thus a specific CC carries control information, that is, RAI of another CC in its control information. In the latter case, as control information included in a CC may indicate resources for another CC, some CCs may not include control information.

The above-described two cases will be described below according to exemplary embodiments of the present invention.

According to exemplary embodiments of the present invention, an MS determines the number of CCs that the MS can simultaneously transmit and receive (N_Max_CC_MS) and report N_Max_CC_MS to a BS. How the MS determines N_Max_CC_MS depends on system capacity, data traffic characteristics, and MS capability.

After determining N_Max_CC_MS, the MS reports N_Max_CC_MS to the BS. N_Max_CC_MS may be transmitted during negotiation between the MS and the BS or during initial access to the BS. The transmission of N_Max_CC_MS may be periodic or non-periodic. Upon receipt of N_Max_CC_MS, the BS determines the number of CCs that it can simultaneously allocate (N_Max_CC_BS) and transmits monitoring CC set information indicating the determined CCs available for simultaneous data transmission to the MS.

Figure 3:
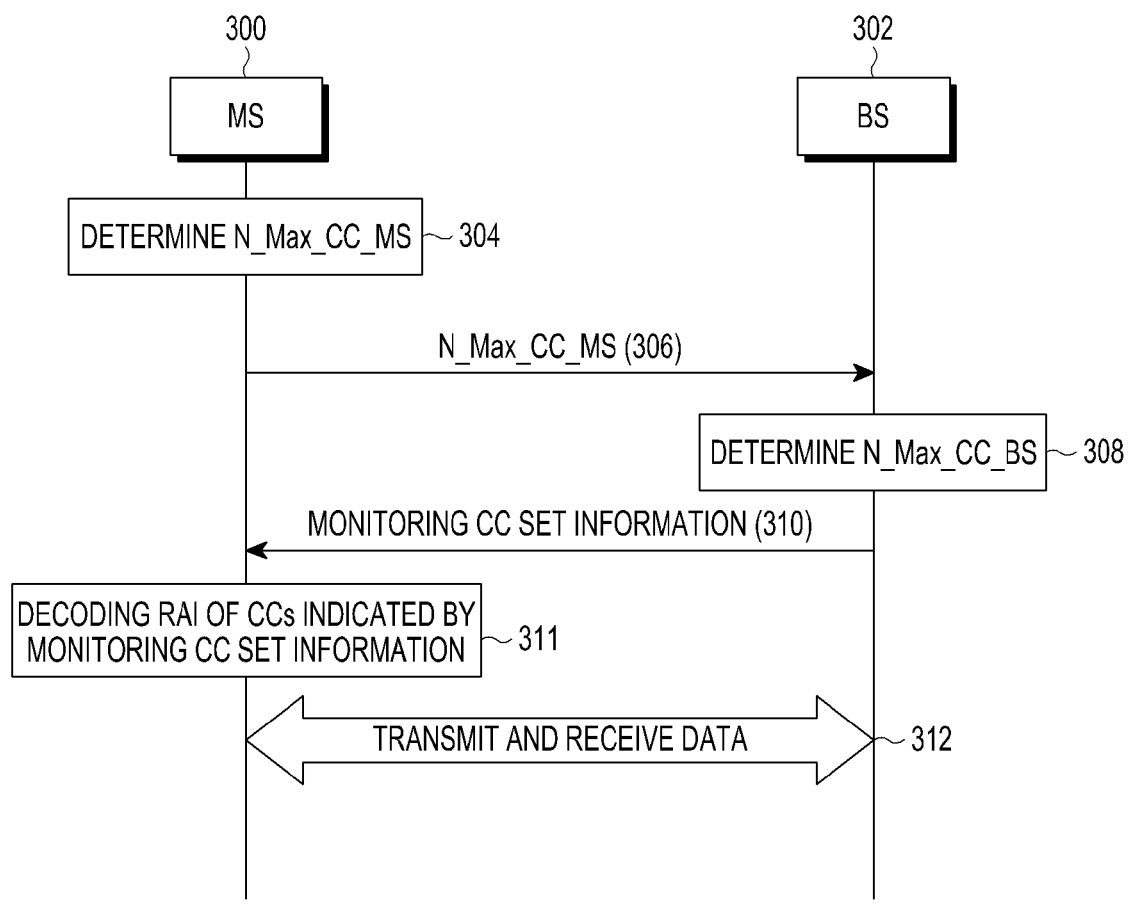
FIG. 3 is a diagram illustrating a signal flow for data transmission and reception on a plurality of CCs between a Mobile Station (MS) and a Base Station (BS) according to an exemplary embodiment of the present invention.

FIG. 3 is a diagram illustrating a signal flow for data transmission and reception on a plurality of CCs between an MS and a BS according to an exemplary embodiment of the present invention.

Referring to FIG. 3, an MS 300 determines N_Max_CC_MS in step 304 and reports N_Max_CC_MS to a BS 302 in step 306. N_Max_CC_MS may be transmitted in a monitoring CC set request message. Upon receipt of N_Max_CC_MS, the BS 302 determines N_Max_CC_BS in step 308. N_Max_CC_BS should be equal to or less than N_Max_CC_MS.

After determining N_Max_CC_BS, the BS 302 transmits monitoring CC set information indicating CCs corresponding to N_Max_CC_BS to the MS 300 in step 310. The monitoring CC set information may include N_Max_CC_BS and Identifiers (IDs) identifying CCs corresponding to N_Max_CC_BS in the monitoring CC set information. If the MS 300 can determine N_Max_CC_BS using the IDs alone, the monitoring CC set information may include only the IDs identifying the CCs corresponding to N_Max_CC_BS.

Upon receipt of the monitoring CC set information, the MS monitors CCs indicated by the monitoring CC set information and decodes resource allocation information received over the CCs in step 311. Monitoring CCs denotes that data received over the CCs is temporarily buffered until control information about the CCs is decoded. The data is transmitted over the monitoring CCs. Because the MS 300 does not know which monitoring CC is carrying data for the MS 300, the MS 300 should temporarily buffer the data received over the monitoring CCs until it interprets control information about the monitoring CCs.

In step 312, the MS 300 receives data transmitted from the BS 302 based on the decoded resource allocation information.

Figure 4:
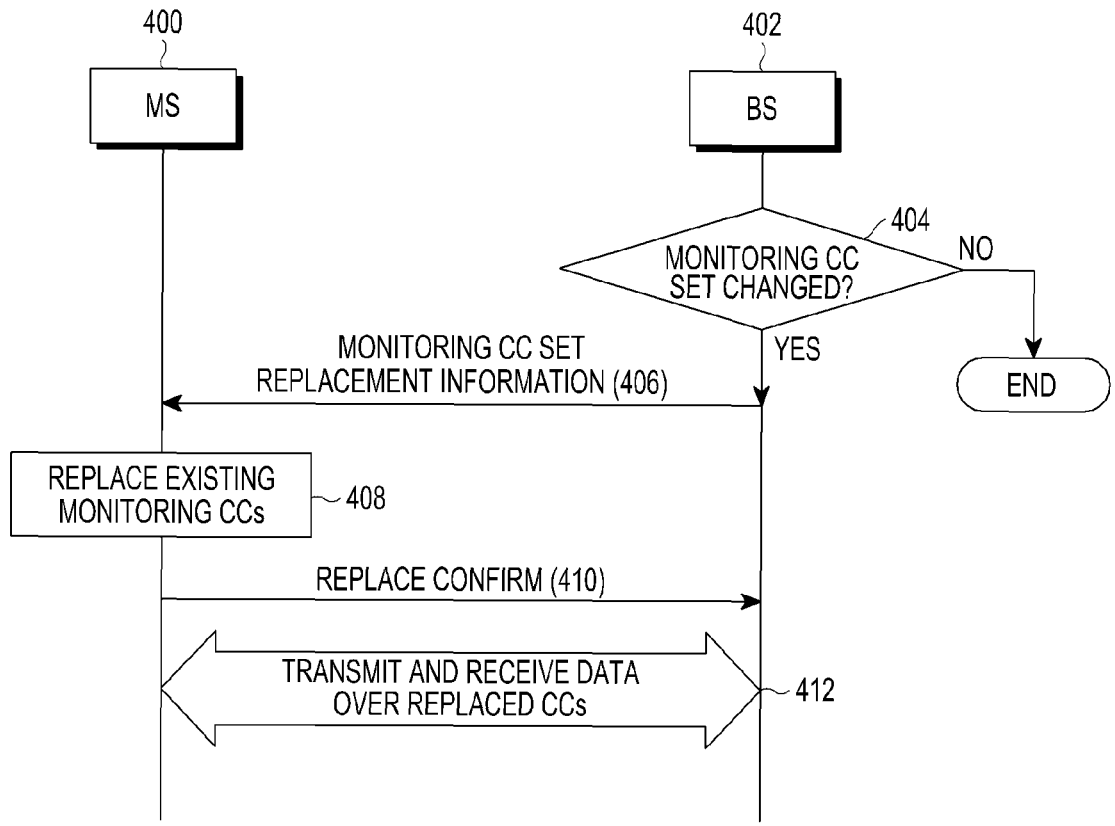
FIG. 4 is a diagram illustrating a signal flow for notifying an MS of changed monitoring CC set information when a BS changes monitoring CC set information according to an exemplary embodiment of the present invention.

FIG. 4 is a diagram illustrating a signal flow for notifying an MS of changed monitoring CC set information when a BS changes monitoring CC set information, according to an exemplary embodiment of the present invention.

Referring to FIG. 4, a BS 402 determines whether a monitoring CC set has been changed in step 404. If the monitoring CC set has been changed, the BS 402 transmits monitoring CC set replacement information to an MS 400 in step 406. The monitoring CC set replacement information may include the ID of a CC removed from previously transmitted monitoring CC set information (removed CC ID) and/or the ID of a CC that will substitute for the removed CC ID (replaced CC ID). If the monitoring CC has not been changed, the procedure ends.

In accordance with an exemplary embodiment of the present invention, the monitoring CC set replacement information may have the following configuration illustrated in Table 1.

TABLE 1

| Removed CC ID (3 bits) | Replaced CC ID (3 bits) |
|---|---|

Upon receipt of the monitoring CC set replacement information, the MS 400 changes existing CCs to changed CCs included in the monitoring CC set replacement information in step 408 and transmits a Replace Confirm message indicating successful CC replacement to the BS 402 in step 410. If the BS 402 fails to receive the Replace Confirm message within a predetermined time, the BS 402 retransmits the monitoring CC set replacement information to the MS 400.

The MS 400 may transmit data to or receive data from the BS 402 over the changed CCs in step 412. Therefore, data can be transmitted or received over CCs other than previous CCs through successful replacement of a CC set, as illustrated in FIG. 4.

Figure 5:
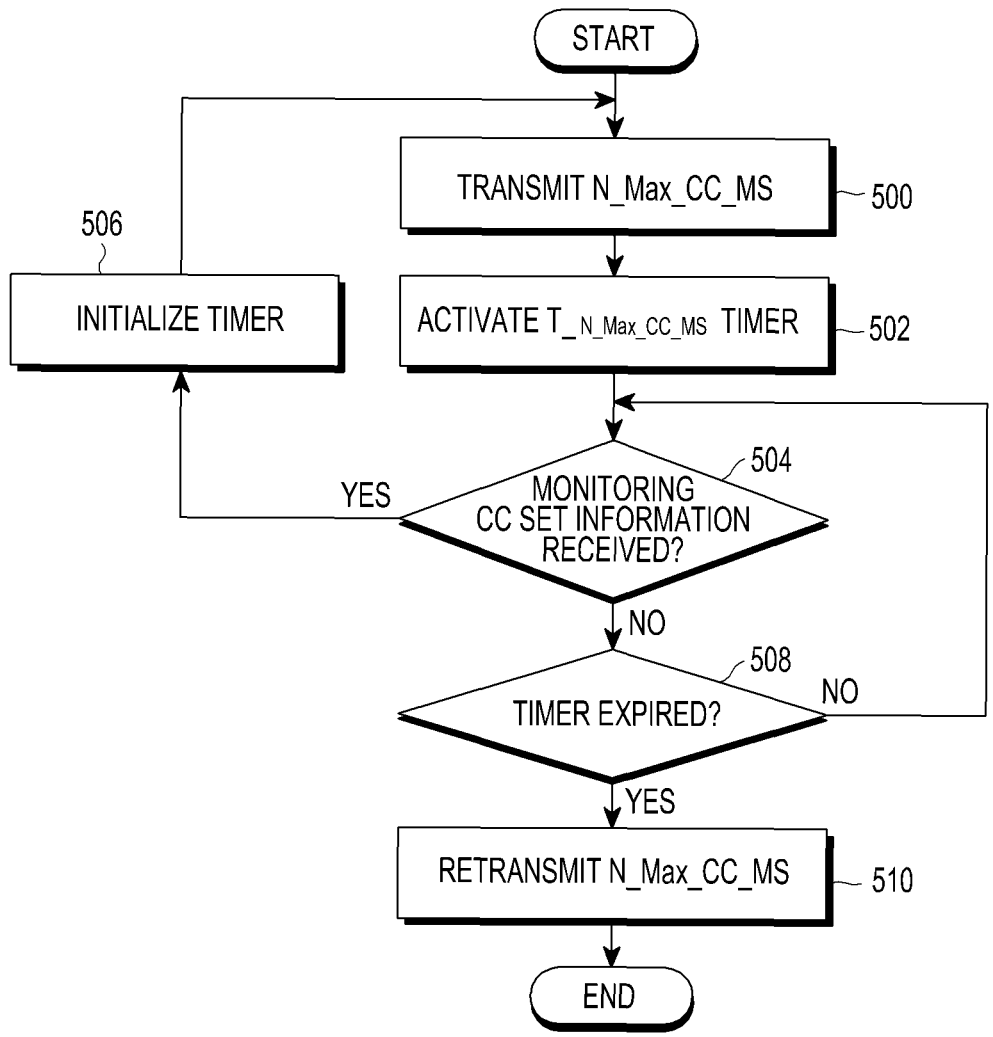
FIG. 5 is a flowchart illustrating a method for activating a maximum CC number timer after an MS transmits a maximum CC number to a BS according to an exemplary embodiment of the present invention.

FIG. 5 is a flowchart illustrating a method for activating a maximum CC number timer after an MS transmits a maximum CC number to a BS according to an exemplary embodiment of the present invention.

Referring to FIG. 5, after transmitting a monitoring CC set request message to the BS in step 500, the MS activates a maximum CC number timer (a T_N_Max_CC_MS timer) in step 502. The monitoring CC set request message includes a maximum number of CCs (N_Max_CC_MS). The MS determines whether monitoring CC set information has been received from the BS in step 504. Upon receipt of the monitoring CC set information, the MS initializes the T_N_Max_CC_MS timer because the MS does not need to retransmit the monitoring CC set request message in step 506.

On the other hand, if the MS fails to receive the monitoring CC set information from the BS in step 504, the MS determines whether the T_N_Max_CC_MS timer has expired in step 508. If the T_N_Max_CC_MS timer still runs, the MS returns to step 504 to continue monitoring reception of monitoring CC set information from the BS.

Upon expiration of the T_N_Max_CC_MS timer in step 508, the MS retransmits the monitoring CC set request message to the BS, determining that the BS has failed to receive N_Max_CC_MS in step 510. A timer value for expiration of the T_N_Max_CC_MS timer may be preset or indicated to the MS by predetermined signaling by the BS.

Figure 6:
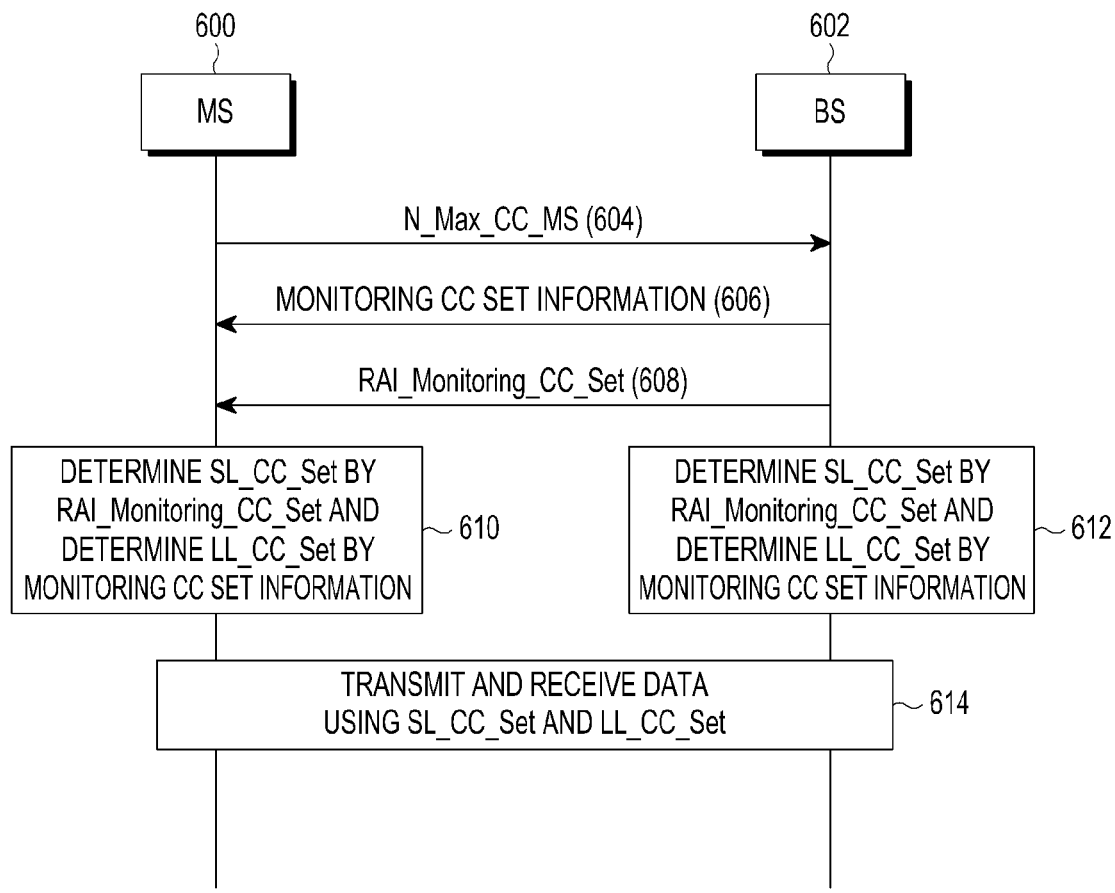
FIG. 6 is a diagram illustrating a signal flow for data transmission and reception on a plurality of CCs between an MS and a BS according to an exemplary embodiment of the present invention.

FIG. 6 is a diagram illustrating a signal flow for data transmission and reception on a plurality of CCs between an MS and a BS according to an exemplary embodiment of the present invention.

Referring to FIG. 6, an MS 600 reports N_Max_CC_MS to a BS 602 in step 604 and the BS 602 transmits monitoring CC set information to the MS 600 in step 606. The BS 602 transmits additional information to the MS 600 in addition to the monitoring CC set information. Not every CC allocated by the BS 602 includes RAI, and thus CCs including RAI should be indicated to the MS 600. Accordingly, the BS 602 transmits to the MS 600 RAI monitoring CC set (RAI_Monitoring_CC_Set) information indicating CCs having RAI among CCs indicated by the monitoring CC set information in step 608.

In steps 610 and 612, the MS 600 and the BS 602 detect a short latency CC set (SL_CC_Set) and a long latency CC set (LL_CC_Set) from the RAI_Monitoring_CC_Set information. The MS 600 and the BS 602 transmit and receive data using the SL_CC_Set and the LL_CC_Set in step 614. Steps 610, 612 and 614 will be described below in greater detail with reference to FIG. 8.

Figure 7:
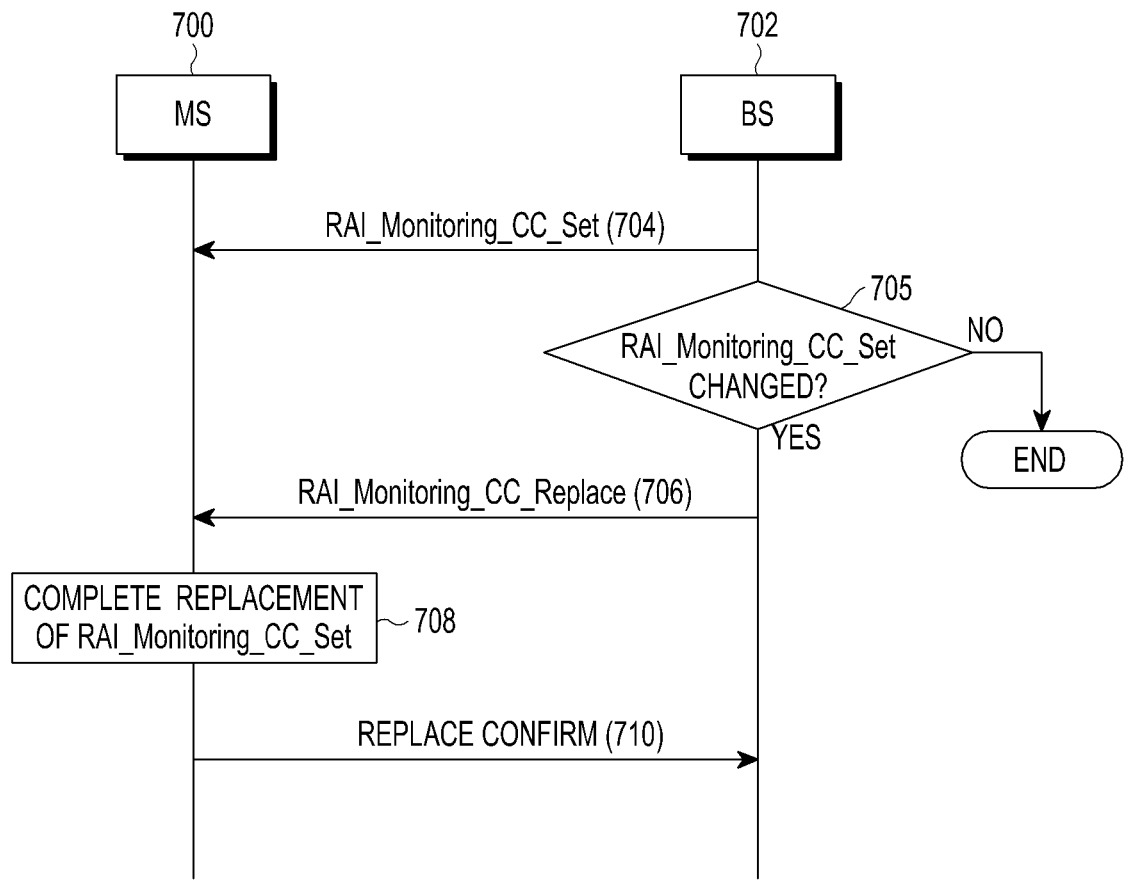
FIG. 7 is a diagram illustrating a signal flow for notifying an MS of changed RAI monitoring CC set information when a BS changes Resource Allocation Information (RAI) monitoring CC set information according to an exemplary embodiment of the present invention.

FIG. 7 is a diagram illustrating a signal flow for notifying an MS of changed RAI_Monitoring_CC_Set information when a BS changes RAI_Monitoring_CC_Set information, according to an exemplary embodiment of the present invention.

Referring to FIG. 7, after transmitting RAI_Monitoring_CC_Set information to an MS 700 in step 704, a BS 702 determines whether the RAI_Monitoring_CC_Set information has been changed in step 705. If the RAI_Monitoring_CC_Set information has been changed, the BS 702 transmits RAI monitoring CC set replacement (RAI_Monitoring_CC_Replace) information to the MS 700 in step 706. The RAI_Monitoring_CC_Replace information may include the ID of a CC removed from the RAI_Monitoring_CC_Set information (removed CC ID) and/or the ID of a CC that will substitute for the removed CC ID (replaced CC ID).

Upon receipt of the RAI_Monitoring_CC_Replace information, the MS 700 replaces an existing RAI monitoring CC set in step 708 and transmits a Replace Confirm message indicating successful CC replacement to the BS 702 in step 710.

Figure 8:
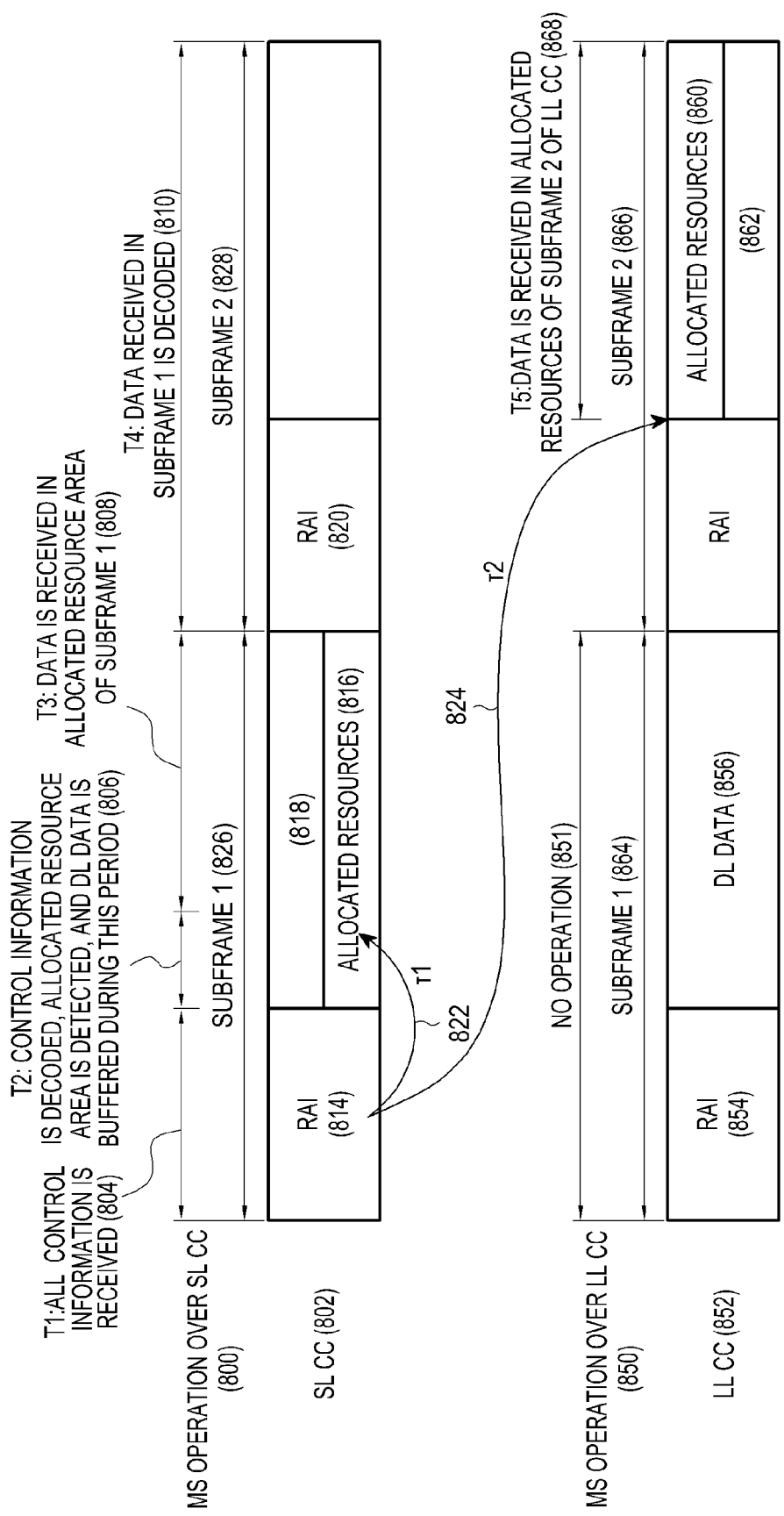
FIG. 8 illustrates an operation for receiving data over CCs allocated by a BS at an MS according to an exemplary embodiment of the present invention.

FIG. 8 illustrates an operation for receiving data over CCs allocated by a BS at an MS according to an exemplary embodiment of the present invention. 'SL CC' denotes a monitoring CC, and 'LLC CC' denotes a CC other than a monitoring CC set.

Referring to FIG. 8, reference numeral 800 denotes an operation of the MS over an SL CC 802 and reference numeral 850 denotes an operation of the MS over an LL CC 852. When resources are allocated using an SL CC, a BS transmits RAI over a CC of an RAI monitoring CC set in a first subframe. The RAI indicates resources allocated to a subframe spaced from the first subframe by time τ1, for data transmission.

When resources are allocated using an LL CC, an MS transmits RAI over a CC of an RAI monitoring CC set in a second subframe. The RAI indicates resources for data transmission allocated to a subframe spaced from the second subframe by time τ2. τ2 is always greater than τ1. It is assumed herein that τ1=0 and τ2=1. If τ1=0, then RAI included in a subframe indicates resources allocated to the same subframe, for data transmission. If τ2=1, then RAI included in a subframe indicates resources allocated to the next subframe, for data transmission.

Upon receipt of a subframe 826 (subframe 1 826), the MS receives all control information of RAI 814 included in the SL CC 802 during a first time period 804 (T1). While only one SL CC 802 is shown in FIG. 8, the MS actually receives control information over all SL CCs during the time period T1. Then the MS decodes the control information received during the time period T1, detects resources allocated to the MS based on the decoded control information, and buffers all DL data received over the SL CC 802, during a second time period 806 (T2). The reason for buffering all DL data during the time period T2 is that the MS does not know a resource area to which a data channel has been allocated because the control information decoding is not completed. Therefore, all DL data received until the control information decoding is completed should be buffered.

During a third time period 808 (T3), the MS locates allocated resources 816 in the SL CC 802 and allocated resources 860 in the LL CC 852 using the control information completely decoded during the time period T2, as indicated by reference numerals 822 and 824. The MS receives data in the allocated resources 816 in subframe 1 being the same frame including the decoded control information. Then the MS decodes the received data during a fourth time period 810 (T4).

The MS performs the same operation on a second subframe 828 (subframe 2 828). The MS acquires RAI from allocation information 820 of subframe 2 828 and receives data in a resource area indicated by the RAI.

The operation 850 of the MS over the LL CC 852 will be described below.

Upon receipt of the LL CC 852 corresponding to subframe 1 864, the MS does not perform any operation on the LL CC 852, as indicated by reference numeral 851. It is because the MS has determined from RAI of an SL CC of a previous subframe that RAI 854 and DL data 856 of subframe 1 864 are not for the MS. If the DL data 856 of the LL CC 852 in subframe 1 864 is for the MS, the MS determines from RAI of an SL CC of a subframe previous to subframe 1 864 that the DL data 856 transmitted in allocated resources of subframe 1 864 is for the MS and receives and decodes the DL data 856. This case is not that shown in FIG. 8 and thus the MS does not perform any operation on the LL CC 852 of subframe 1 864.

During a fifth time period 868 (T5), the MS receives data in the allocated resources 860 indicated by the RAI decoded during the time period T2, spaced from the RAI 814 of the SL CC 802 by the time τ2 in subframe 2 866, as indicated by reference numeral 824. Reference numerals 818 and 862 denote resources to which data directed to other MSs is allocated.

While a DL data reception method of an MS based on a resource allocation method according to an exemplary embodiment of the present invention has been described, UL data can be transmitted in the same or a similar manner.

As described above, a multi-carrier BS that services an MS capable of simultaneously transmitting or receiving data over a predetermined number of (N_Max_CC) CCs can balance the load of each CC. Especially in a system having CCs that do not carry RAI, load balancing can be achieved by managing LL CCs.

Figure 9:
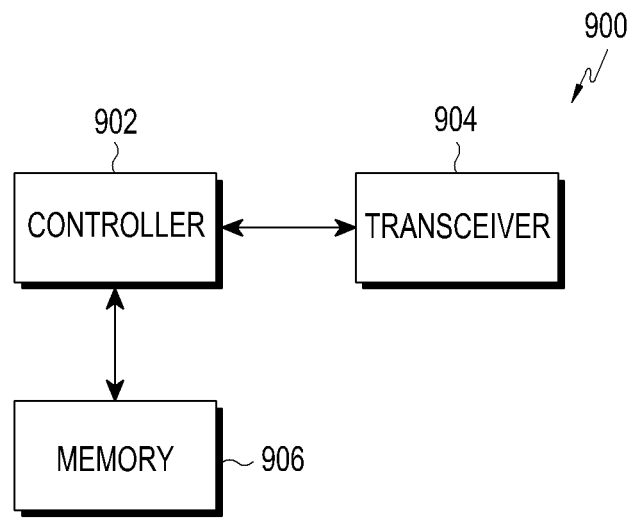
FIG. 9 is a block diagram of an MS according to an exemplary embodiment of the present invention.

FIG. 9 is a block diagram of an MS according to an exemplary embodiment of the present invention.

Referring to FIG. 9, a controller 902 provides overall control to the MS 900. The MS 900 may also include additional components not necessary for exemplary embodiments of the present invention; accordingly, for convenience of description these additional components are not shown. The MS 900 may be, for example, a mobile telephone, smartphone, Personal Digital Assistant (PDA), personal entertainment device, portable computer, and the like.

In accordance with an exemplary embodiment of the present invention, the controller 902 determines the number of available CCs (N_Max_CC_MS) for simultaneous data transmission and reception and reports N_Max_CC_MS to a BS through a transceiver 904. Upon receipt of monitoring CC set information from the BS through the transceiver 904, the controller 902 controls the transceiver 904 to receive data over a CC indicated by the monitoring CC set information.

Upon receipt of monitoring CC set replacement information from the BS, the controller 902 removes a CC corresponding to a removed CC ID included in the received monitoring CC set replacement information and controls the transceiver 904 to transmit or receive data over a CC corresponding to a replaced CC ID in substitution for the removed CC ID.

The transceiver 904 monitors CCs determined by the controller 902 and transmits and receives data to and from the BS over the CCs. A memory 906 stores N_Max_CC_MS determined by the controller 902 and also stores the monitoring CC set information received from the BS and data to be transmitted to the BS or received from the BS. In addition, if the monitoring CC set replacement information is received from the BS, the memory 906 stores information about replaced CCs.

In accordance with another exemplary embodiment of the present invention, the controller 902 determines N_Max_CC_MS and reports N_Max_CC_MS to a BS through the transceiver 904. Upon receipt of RAI monitoring CC set information after receiving monitoring CC set information from the BS through the transceiver 904, the controller 902 controls the transceiver 904 to receive data using the monitoring CC set information and the RAI monitoring CC set information.

The MS 902 controls the transceiver 904 to receive data in allocated resources indicated by RAI in an SL CC included in a CC set indicated by the RAI monitoring CC set information. Since an LL CC included in the monitoring CC set information but not included in the RAI monitoring CC set information does not carry RAI for the MS 900, the controller 902 controls the transceiver 904 to receive data in resources indicated by the RAI of the SL CC. Upon receipt of RAI monitoring CC set replacement information indicating that the RAI monitoring CC set information has been changed from the BS through the transceiver 904, the controller 902 removes a CC corresponding to a removed CC ID included in the received RAI monitoring CC set replacement information and controls the transceiver 904 to transmit or receive data over a CC corresponding to a replaced CC ID in substitution for the removed CC ID.

The memory 906 stores N_Max_CC_MS determined by the controller 902 and also stores the monitoring CC set information and the RAI monitoring CC set information received from the BS. In addition, if the RAI monitoring CC set replacement information is received from the BS, the memory 906 stores information about replaced CCs.

The controller 902 controls the transceiver 904 to transmit the number of CCs over which the MS 900 can simultaneously transmit or receive data to the BS, to receive monitoring CC set information indicating as many CCs as or fewer CCs than the reported number of CCs from the BS, and to receive data from the BS over a monitoring CC indicated by the monitoring CC set information. The controller 902 may also control the transceiver 904 to receive information about CCs including RAI (i.e. RAI CC set information) among the monitoring CCs from the BS, and further considers the RAI CC set information in addition to the monitoring CC set information when receiving data from the BS.

Figure 10:
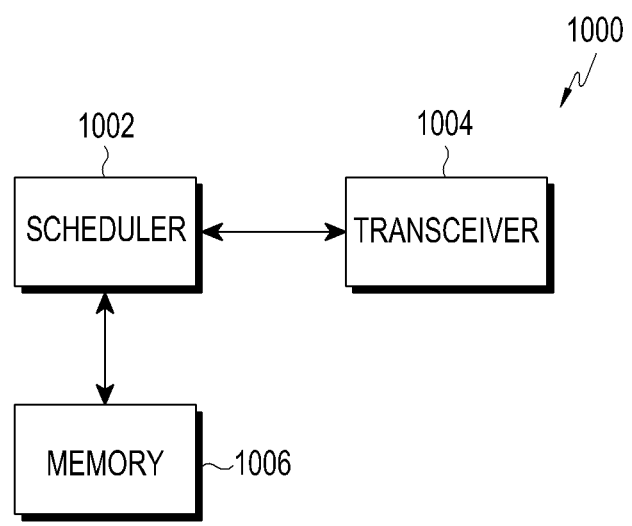
FIG. 10 is a block diagram of a BS according to an exemplary embodiment of the present invention.

FIG. 10 is a block diagram of a BS according to an exemplary embodiment of the present invention.

Referring to FIG. 10, a scheduler 1002 controls data transmission and reception according to procedures including a procedure for allocating resources to an MS.

In accordance with an exemplary embodiment of the present invention, upon receipt of N_Max_CC_MS from an MS through a transceiver 1004, the scheduler 1002 determines the number of CCs that the scheduler 1002 can simultaneously allocate based on N_Max_CC_MS and notifies the MS of the determined number of CCs as monitoring CC set information through the transceiver 1004. The scheduler 1002 controls the transceiver 1004 to transmit data on CCs indicated by the monitoring CC set information.

If the scheduler 1002 changes the monitoring CC set information, the scheduler 1002 transmits monitoring CC set replacement information including information about changed monitoring CCs to the MS through the transceiver 1004.

The transceiver 1004 can transmit and receive data and information to and from the MS. The memory 1006 stores N_Max_CC_MS received from the MS, the monitoring CC set information determined by the scheduler 1002, and data to be transmitted to or data received from the MS. The memory 1006 also stores information about replaced CCs included in the monitoring CC set replacement information.

In accordance with another exemplary embodiment of the present invention, upon receipt of N_Max_CC_MS from an MS through the transceiver 1004, the scheduler 1002 determines the number of CCs that the scheduler 1002 can simultaneously allocate based on N_Max_CC_MS and notifies the MS of the determined number of CCs as monitoring CC set information through the transceiver 1004. In addition, the scheduler 1002 determines RAI monitoring CC set information indicating a set of CCs including RAI among CCs indicated by the monitoring CC set information and transmits the RAI monitoring CC set information to the MS through the transceiver 1004.

The scheduler 1002 controls the transceiver 1004 to transmit data based on the monitoring CC set information and the RAI monitoring CC set information.

With respect to an SL CC included in a CC set indicated by the RAI monitoring CC set information, the scheduler 1002 controls the transceiver 1004 to transmit data in resources indicated by RAI of the SL CC. For an LL CC that is included in the CC set indicated by the monitoring CC set information but not included in the CC set indicated by the RAI monitoring CC set information, the scheduler 1002 controls the transceiver 1004 to transmit data in resources indicated by the RAI of the SL CC because RAI is not included in the LL CC for the MS. If the RAI monitoring CC set information has been changed, the scheduler 1002 transmits RAI monitoring CC set replacement information including information about a removed CC ID and a replaced CC ID to the MS through the transceiver 1004.

The memory 1006 stores N_Max_CC_MS received from the MS and stores the monitoring CC set information and RAI monitoring CC set information determined by the scheduler 1002. When the scheduler 1002 changes an RAI monitoring CC set, the memory 1006 also stores information about CCs included in a changed RAI monitoring CC set.

The scheduler 1002 receives information about the number of CCs over which an MS can simultaneously receive data from the MS, transmits to the MS monitoring CC set information indicating as many monitoring CCs as or fewer monitoring CCs than the number of CCs, and controls the transceiver 1004 to transmit data to the MS over the monitoring CCs. The scheduler 1002 may also control the transceiver 1004 to transmit RAI monitoring CC set information indicating CCs having RAI among the monitoring CCs to the MS. In this case, data is transmitted to the MS, taking into account the RAI monitoring CC set information in addition to the monitoring CC set information.

As is apparent from the above description, a BS and an MS can efficiently transmit and receive data to and from each other in a mobile communication system using a plurality of CCs according to an exemplary embodiment of the present invention.

The above-described methods according to the foregoing embodiments may be implemented as code that can be written on a computer-readable recording medium and can thus be read by a processor. The computer-readable recording medium may be any type of recording device in which data is stored in a computer-readable manner. Examples of the computer-readable recording medium include a ROM, a RAM, a CD-ROM, a magnetic tape, a floppy disc, and an optical data memory. Functional programs, code, and code segments needed to realize the embodiments herein can be construed by one of ordinary skill in the art.

For example, the term "unit" covers components such as software components, object-oriented software components, class components, and task components, processes, functions, attributes, procedures, sub-routines, segment of program code, drivers, firmware, microcode, circuits, data, database, data structures, tables, arrays, and variables.

Components and functions of '-units' may be combined into fewer components and '-units' or may be separated into more components and '-units'. New components and '-units' may be added.

While the present invention has been particularly shown and described with reference to certain exemplary embodiments thereof, it will be understood by those of ordinary skill in the art that various changes in form and details may be made therein without departing from the spirit and scope of the present invention as defined by the following claims and their equivalents.

What is claimed is:

1. A method for receiving data over a plurality of carrier components at a mobile station (MS), the method comprising:
   receiving, during a first time period in a first subframe, resource allocation information including a first allocation information indicating a first resource allocated to a first carrier component in the first subframe, and a second allocation information indicating a second resource allocated to a second carrier component in a second subframe; and
   decoding the first allocation information and the second allocation information, detecting the first resource allocated to the first carrier component in the first subframe based on the decoded first allocation information, and buffering data received on the first resource, during a second time period in the first subframe.

2. The method of claim 1, further comprising:
   receiving data, on the second resource of the second carrier component based on the second allocation information during a second time period in the second subframe.

3. The method of claim 1, wherein the second time period starts at an end of the first time period.

4. The method of claim 1, wherein the resource allocation information further comprises offset information indicating locations of the first subframe and the second subframe.

5. The method of claim 1, wherein the first carrier component is included in monitoring carrier components and the second carrier component is included in carrier components other than the monitoring carrier components.

6. An apparatus for receiving data over a plurality of carrier components at a mobile station (MS), the apparatus comprising:
   a transceiver configured to:
      receive, during a first time period in a first subframe, resource allocation information including a first allocation information indicating a first resource allocated to a first carrier component in the first subframe, and a second allocation information indicating a second resource allocated to a second carrier component in a second subframe; and
      decode the first allocation information and the second allocation information, detect the first resource allocated to the first carrier component in the first subframe based on the decoded first allocation information, and buffer data received on the first resource during a second time period in the first subframe.

7. The apparatus of claim 6, wherein the transceiver is further configured to receive data on the second resource of the second carrier component based on the second allocation information during a second time period in the second subframe.

8. The apparatus of claim 6, wherein the second time period starts at an end of the first time period.

9. The apparatus of claim 6, wherein the resource allocation information further comprises offset information indicating locations of the first subframe and the second subframe.

10. The apparatus of claim 6, wherein the first carrier component is included in monitoring carrier components and the second carrier component is included in carrier components other than the monitoring carrier components.

11. A method for transmitting data over a plurality of carrier components at a base station (BS), the method comprising:
    transmitting, during a first time period in a first subframe, to a mobile station (MS), resource allocation information including a first allocation information indicating a first resource allocated to a first carrier component in the first subframe, and a second allocation information indicating a second resource allocated to a second carrier component in a second subframe; and
    transmitting data, to the MS, on the first resource of the first carrier component, during a second time period in the first subframe.

12. The method of claim 11, further comprising:
    transmitting data, on the second resource of the second carrier component based on the second allocation information during a second time period in the second subframe.

13. The method of claim 11, wherein the second time period starts at an end of the first time period.

14. The method of claim 11, wherein the resource allocation information further comprises offset information indicating locations of the first subframe and the second subframe.

15. The method of claim 11, wherein the first carrier component is included in monitoring carrier components and the second carrier component is included in carrier components other than the monitoring carrier components.

16. An apparatus for transmitting data over a plurality of carrier components at a base station (BS), the apparatus comprising:
    a transceiver configured to:
       transmit, during a first time period in a first subframe to a mobile station (MS) resource allocation information including a first allocation information indicating a first resource allocated to a first carrier component in the first subframe, and a second allocation information indicating a second resource allocated to a second carrier component in a second subframe, and
       transmit data to the MS on the first resource of the first carrier component during a second time period in the first subframe.

17. The apparatus of claim 16, wherein the transceiver is further configured to transmit data, on the second resource of the second carrier component based on the second allocation information during a second time period in the second subframe.

18. The apparatus of claim 16, wherein the second time period starts at an end of the first time period.

19. The apparatus of claim 16, wherein the resource allocation information further comprises offset information indicating locations of the first subframe and the second subframe.

20. The apparatus of claim 16, wherein the first carrier component is included in monitoring carrier components and the second carrier component is included in carrier components other than the monitoring carrier components.

* * * * *